US012246332B2

(12) United States Patent
Dickie et al.

(10) Patent No.: US 12,246,332 B2
(45) Date of Patent: Mar. 11, 2025

(54) MIXTURE OF OCTENE HYDROFORMYLATION BY-PRODUCT AND DIESEL, KEROSENE OR $C_8$-$C_{20}$ OLEFINS AS COLLECTORS

(71) Applicant: BASF SE, Ludwigshafen am Rhein (DE)

(72) Inventors: Scott Alexander Dickie, Auckland (NZ); Qian Bai, Shanghai (CN); Adrian Mauricio Villanueva Berindoague, Ludwigshafen (DE); Alexej Michailovski, Ludwigshafen (DE)

(73) Assignee: BASF SE, Ludwigshafen am Rhein (DE)

(*) Notice: Subject to any disclaimer, the term of this patent is extended or adjusted under 35 U.S.C. 154(b) by 700 days.

(21) Appl. No.: 17/435,406

(22) PCT Filed: Mar. 3, 2020

(86) PCT No.: PCT/EP2020/055490

§ 371 (c)(1),
(2) Date: Sep. 1, 2021

(87) PCT Pub. No.: WO2020/178262

PCT Pub. Date: Sep. 10, 2020

(65) Prior Publication Data

US 2022/0176385 A1 Jun. 9, 2022

(30) Foreign Application Priority Data

Mar. 5, 2019 (WO) ................ PCT/CN2019/077005
Apr. 9, 2019 (EP) .................................... 19168108

(51) Int. Cl.
*B03D 1/008* (2006.01)
*B03D 1/006* (2006.01)

(52) U.S. Cl.
CPC ............ *B03D 1/008* (2013.01); *B03D 1/006* (2013.01); *B03D 2201/02* (2013.01); *B03D 2203/06* (2013.01); *B03D 2203/08* (2013.01)

(58) Field of Classification Search
CPC ...... B03D 1/02; B03D 1/008; B03D 2201/02; B03D 2203/08; B03D 1/006; B03D 1/016; B03D 2201/04; B03D 2203/02; B03D 1/01; B03D 1/012; B03D 3/06; B03D 1/0043; B03D 1/014; B03D 1/0046; B03D 2203/006; B03D 2201/06; B03D 2203/06; B03D 1/021; B03D 2201/007; B03D 1/002; B03D 1/00; B03D 1/08; B03D 2203/04; B03D 1/004; B03D 1/025; B03D 1/06; B03D 1/16; B03D 2203/025; B03D 1/018; B03D 1/023; B03D 1/026; B03D 1/082; B03D 1/1406; B03D 1/1475; B03D 1/247; B03D 2203/10; B03D 1/1431; B03D 1/1468; B03D 2201/002; B03D 1/011; B03D 1/085; B03D 1/12; B03D 1/18; B03D 1/24; B03D 2201/005; B01D 17/047
USPC .......................................................... 209/167
See application file for complete search history.

(56) References Cited

U.S. PATENT DOCUMENTS

| | | | | | |
|---|---|---|---|---|---|
| 2,094,646 | A | | 10/1937 | Frantz | |
| 4,148,830 | A | * | 4/1979 | Pruett | C07C 45/50 568/454 |
| 4,229,586 | A | * | 10/1980 | Ward | C10L 1/06 585/329 |
| 4,278,533 | A | | 7/1981 | Hefner, Jr. | |
| 4,528,107 | A | | 7/1985 | McCaffrey et al. | |
| 4,589,980 | A | | 5/1986 | Keys | |
| 4,770,767 | A | * | 9/1988 | Hansen | B03D 1/008 252/61 |
| 5,022,983 | A | | 6/1991 | Myers et al. | |
| 5,053,551 | A | * | 10/1991 | Harrison | C07C 45/50 568/454 |
| 5,223,147 | A | | 6/1993 | Rosenstock et al. | |
| 5,498,809 | A | | 3/1996 | Emert et al. | |
| 8,302,778 | B2 | | 11/2012 | Tran | |
| 8,955,685 | B2 | | 2/2015 | Tran et al. | |
| 11,542,447 | B2 | | 1/2023 | Koseoglu et al. | |
| 2003/0146134 | A1 | | 8/2003 | Yoon | |
| 2007/0187300 | A1 | | 8/2007 | Tran et al. | |

(Continued)

FOREIGN PATENT DOCUMENTS

| | | | |
|---|---|---|---|
| CN | 101384369 | A | 3/2009 |
| CN | 104525385 | A | 4/2015 |

(Continued)

OTHER PUBLICATIONS

Evonik, GPS Safety Summary, Octene, hydroformylation products, high-boiling, Nov. 2011 (Year: 2011).*

(Continued)

*Primary Examiner* — Patrick Orme
*Assistant Examiner* — Boi-Lien Thi Nguyen
(74) *Attorney, Agent, or Firm* — Faegre Drinker Biddle & Reath LLP

(57) ABSTRACT

The presently claimed invention relates to a process for the beneficiation of coal and other hydrophobic materials, wherein a collector composition comprising by-products obtained by hydroformylation of octene isomers as a first component and diesel, kerosene and/or $C_8$-$C_{20}$ olefins as a second component is used.

15 Claims, No Drawings

(56) References Cited

U.S. PATENT DOCUMENTS

| | | | | |
|---|---|---|---|---|
| 2012/0111772 A1* | 5/2012 | Tran | B03D 1/008 209/166 |
| 2012/0132571 A1* | 5/2012 | Filler | B03D 1/006 209/166 |
| 2015/0090666 A1 | 4/2015 | Counter et al. | |
| 2015/0174588 A1* | 6/2015 | Danyliw | B03D 1/02 209/166 |
| 2019/0004827 A1 | 1/2019 | Preston et al. | |

FOREIGN PATENT DOCUMENTS

| | | | |
|---|---|---|---|
| CN | 107081220 | A | 8/2017 |
| CN | 108940602 | A | 12/2018 |
| CN | 118176275 | A | 6/2024 |
| DE | 102009028975 | A1 | 3/2011 |
| GB | 1550961 | A | 8/1979 |
| RU | SU1238802 | A1 | 6/1986 |
| RU | 2508394 | C2 | 2/2014 |
| RU | 2688689 | C2 | 5/2019 |
| WO | 2008/157613 | A1 | 12/2008 |
| WO | 2014/085274 | A1 | 6/2014 |

OTHER PUBLICATIONS

Organic Chemistry at CU Boulder, Distillation (Year: 2017).*

Lois. Encyclopedia of Physical Science and Technology (Third Edition), Academic Press, 2003, pp. 275-314, ISBN 9780122274107 (Year: 2003).*

Evonik Industries Ag: "Evonik-GPS Safety Summary—Octene, hydroformulation products, high-boiling" Nov. 1, 2011; http://www13.evonik.com/asp/documents/safetysummary/2973_Safety_Summary_Report.pdf: p. 1.

Shaharun MS et al. "Hydroformylation of 1-octene using rhodium-phosphite catalyst in a thermomorphic solvent system" Chemical Engineering Science, Oxford, GB;Jan. 1, 2010;(65) No. 1;273-281.

Nuki West "Synthese von amphiphilen unimolekularen Mizellen als Liganden zur Hydroformylierung in wässrigen Medien" Oct. 22, 2001; http://mediatum.ub.tum.de/doc/601142/601142.pdf.

International Search Report for International Application No. PCT/EP2020/055490 Mailed Jun. 2, 2020, 3 pgs.

"Octene, hydroformulation products, high-boiling", GPS Safety Summary—Evonik Industries AG, Version 1, Nov. 2011, 4 pages.

European Search Report for EP Patent Application No. 19168108.9, Issued on Nov. 8, 2019, 3 pages.

International Search Report for PCT Patent Application No. PCT/EP2020/055490, Issued on Jun. 2, 2020, 4 pages.

Nuki West, "Synthese von amphiphilen unimolekularen Mizellen als Liganden zur Hydroformylierung in wäßrigen Medien", Dissertation-Institut für Technische Chemie, Lehrstuhl für makromolekulare stoffe, Technische Universitat Munchen, Nov. 22, 2000, 163 pages.

Shaharun, et al., "Hydroformylation of 1-octene using rhodium-phosphite catalyst in a thermomorphic solvent system", Chemical Engineering Science, vol. 65, Issue 1, Jan. 1, 2010, pp. 273-281.

"Kirk-Othmer Encyclopedia of Chemical Technology", Third Edition, vol. 8, pp. 900-912.

Chatt, J., "New Syntheses with Carbon Monoxide : J. Falbe (Ed.), Springer Verlag, Berlin, Heidelberg, New York, 1980, xiv + 465 pages, DM 244.", Journal of Organometallic Chemistry, vol. 213, Issue 2, Jun. 1981, C60 page.

International Preliminary Report on Patentability received for PCT Patent Application No. PCT/EP2020/055490, mailed on Sep. 16, 2021, 9 pages.

Ma et al., "Hydroformylation of mixed octenes catalyzed by supported rhodium-based catalyst", Fuel Processing Technology, vol. 90, No. 10, Oct. 2009, pp. 1241-1246.

* cited by examiner

MIXTURE OF OCTENE HYDROFORMYLATION BY-PRODUCT AND DIESEL, KEROSENE OR $C_8$-$C_{20}$ OLEFINS AS COLLECTORS

FIELD OF THE INVENTION

The presently claimed invention relates to a process for the beneficiation of coal and other hydrophobic materials, wherein a collector composition comprising by-products obtained by hydroformylation of octene isomers as a first component and diesel, kerosene and/or $C_8$-$C_{20}$ olefins as a second component is used.

BACKGROUND OF THE INVENTION

When coal is mined, the raw product consists of coal and rock, with rock naturally occurring as small partings within the coal that cannot be avoided during the mining process. To concentrate the coal, large fragments of non-combustible mineral/matter are removed by screening or gravity separation techniques. Froth flotation is commonly used to beneficiate the finely divided raw coal. Certain coals such as bituminous coals possess a natural hydrophobicity, which results in the coal being naturally floatable in the aqueous medium, but the use of reagents is still commonly required to enhance floatability and therefore recovery. Effective preparation of coal prior to combustion improves the homogeneity of the coal supplied, produces less ash for disposal at power plants and other use sources, and reduces emissions of oxides of sulfur. Froth flotation/coal washing is an important method for reducing ash in coal. Washing the ash and coal is particularly critical for reducing sulfur.

During coal washing, the ore is crushed and wet ground to obtain a pulp. A frothing agent, usually employed with a collecting agent, is added to the coal/water slurry to affect the flotation. The coal slurry is aerated to produce froth at the surface thereof and the collector assists the frothing agent in separating the coal from the ore by causing the coal to adhere to the bubbles formed during the aeration process. The portion of the ore which is not carried over with the froth is usually identified as flotation tailings or gangue and is disposed of or reprocessed. The purpose of the collector is to increase the hydrophobicity of the coal particles to permit better attachment to the bubbles which are considered hydrophobic. The purpose of the frothing agent is to stabilize bubbles and provide for a significant concentration of fine bubbles for attachment to the coal. The difference in density between the air bubbles and water provides buoyancy that preferentially lifts the hydrophobic solid particles to the surface, where they remain entrained in the froth which can be drained off or mechanically skimmed away thereby effecting separation.

Collectors used in the froth flotation of coal generally comprise hydrocarbon oils of which distillate oils such as kerosene, industrial diesel fuel and fuel oil are some of the most widely used, especially kerosene. Earlier collectors included hydrocarbons produced as coke-oven byproducts, the use of these materials has been largely discontinued since they contain phenols and other toxic aromatic hydrocarbons that pose ecological problems. Accordingly, today the most widely used collectors are diesel or kerosene, i.e., the middle distillate cuts. The problem with these middle distillate hydrocarbons is that they may contain significant amounts of polynuclear aromatics by up to 15% by wt., which result in increased levels of carcinogenicity and toxicity. Diesel oil contains other HAPS (Hazardous Air Pollutants) listed materials such as benzene, toluene, ethylbenzene, etc. in amounts ranging from about 0.5% to about 2% by wt. These materials are also highly toxic and pose problems with ground water contamination.

Diesel or similar kerosene-based collectors have poor dispersibility in the pulp and are not able to adequately hydrophobize all coal minerals.

US 2015/0090666 discloses active collectors for mineral flotation which are selected from the list consisting of diesel, paraffin oil, kerosene, fatty acids, fatty acid esters, neutralized fatty acids, soaps, amine compounds, petroleum-based oily compounds, decant oils, light cycle oils, fuel oils, organic type collector, and any combination thereof.

U.S. Pat. No. 8,955,685 discloses a method of separating a first material from a second material using a beneficiation composition. The beneficiation composition comprises one or more glyceride and fatty acid mixtures extracted from an ethanol process.

There has been a continuing effort to find alternatives to the use of diesel or kerosene as collectors. However, the alternatives for diesel and kerosene need to be efficient collectors so as to affect the beneficiation process in a short time. Hence, there is a need to improve the process of beneficiation using alternatives to diesel or kerosene which are used as collectors.

In the light of the prior art, it is an object of the presently claimed invention to provide an improved process for beneficiation of hydrophobic material, in particular coal, in a flotation process.

It is another object to provide a method for beneficiation of hydrophobic material in a flotation process, wherein the beneficiated material, in particular coal, is obtained in a high yield with high selectivity.

SUMMARY OF THE INVENTION

Surprisingly, it was found that the use of by-products obtained by hydroformylation of octene isomers in a collector composition improves the yield of beneficiation of a hydrophobic material, in particular coal, in a flotation process.

In one aspect the presently claimed invention is directed to a method for the beneficiation of at least one material, the method comprises the steps of:

a) providing a slurry comprising the at least one material dispersed in a liquid, b) contacting the slurry with a collector composition, c) recovering a beneficiated material, wherein the collector composition comprises a mixture of collector A and collector B; wherein the collector A are by-products obtained by hydroformylation of octene isomers and the collector B is selected from the group consisting of diesel, kerosene and $C_8$-$C_{20}$ olefins.

In another aspect the presently claimed invention is directed to the use of a collector composition comprising a mixture of collector A and collector B; wherein the collector A are by-products obtained by hydroformylation of octene isomers and the collector B is selected from the group consisting of diesel, kerosene and $C_8$-$C_{20}$ olefins in the beneficiation process.

In another aspect the presently claimed invention is directed to a composition comprising at least one material, a collector composition and a liquid, wherein the collector composition comprises a mixture of collector A and collector B; wherein the collector A are by-products obtained by hydroformylation of octene isomers and the collector B is selected from the group consisting of diesel, kerosene and $C_8$-$C_{20}$ olefins.

In a further aspect of the presently claimed invention, the collector composition is used for the beneficiation of materials which require an oily collector. Specifically, the collector composition is used for the beneficiation of coal, molybdenum ore, phosphate ore, graphite and other hydrophobic materials.

DETAILED DESCRIPTION OF THE INVENTION

Before the present compositions and formulations of the invention are described, it is to be understood that this invention is not limited to particular compositions and formulations described, since such compositions and formulation may, of course, vary. It is also to be understood that the terminology used herein is not intended to be limiting, since the scope of the presently claimed invention will be limited only by the appended claims.

If hereinafter a group is defined to comprise at least a certain number of embodiments, this is meant to also encompass a group which preferably consists of these embodiments only. Furthermore, the terms “first”, “second”, “third” or “(a)”, “(b)”, “(c)”, “(d)” etc. and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein. In case the terms “first”, “second”, “third” or “(A)”, “(B)” and “(C)” or “(a)”, “(b)”, “(c)”, “(d)”, “i”, “ii” etc. relate to steps of a method or use or assay there is no time or time interval coherence between the steps, that is, the steps may be carried out simultaneously or there may be time intervals of seconds, minutes, hours, days, weeks, months or even years between such steps, unless otherwise indicated in the application as set forth herein above or below.

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to “one embodiment” or “a preferred embodiment” means that a particular feature, structure or characteristic described in connection with the embodiment is included in at least one embodiment of the presently claimed invention. Thus, appearances of the phrases “in one embodiment” or “in a preferred embodiment” or “in another embodiment” in various places throughout this specification are not necessarily all referring to the same embodiment, but may.

Furthermore, the particular features, structures or characteristics may be combined in any suitable manner, as would be apparent to a person skilled in the art from this disclosure, in one or more embodiments. Furthermore, while some embodiments described herein include some, but not other features included in other embodiments, combinations of features of different embodiments are meant to be within the scope of the invention, and form different embodiments, as would be understood by those in the art. For example, in the appended claims, any of the claimed embodiments can be used in any combination.

Furthermore, the ranges defined throughout the specification include the end values as well i.e. a range of 1 to 10 implies that both 1 and 10 are included in the range. For the avoidance of doubt, the applicant shall be entitled to any equivalents according to the applicable law.

Certain terms are first defined so that this disclosure can be more readily understood. Unless defined otherwise, all technical and scientific terms used herein have the same meaning as commonly understood by one of ordinary skill in the art to which embodiments of the invention pertain.

As used herein, the term “beneficiation” means separating useful matter from waste, particularly hydrophobic substances such as coal from hydrophilic substances, which results in a useful matter with a higher grade, i.e. a concentrate. Suitable processes for beneficiation include, but are not limited to, direct flotation, reverse flotation and similar technologies.

As used herein, the term “material” means the material which is desired in the pure form and which is free of impurities. The term material includes minerals and non-minerals.

The term “flotation” relates to the separation of minerals based on differences in their hydrophobicity and their different ability to adhere or attach to air bubbles. The aim of flotation as mineral processing operation is to selectively separate certain materials. Flotation comprises froth flotation methods like for example direct flotation or reverse flotation. Direct flotation of materials refers to methods, wherein particular materials are collected in the froth and the impurities remain in the slurry. Reverse flotation or inverse flotation of materials relates to methods, wherein the impurities as undesired materials are collected in the froth and the material of interest remain in the slurry as cell product.

“Frother” or “Frothing Agent” means a composition of matter that enhances the formation of the micro-bubbles and stabilizes the formed micro-bubbles bearing the hydrophobic fraction that result from the sparging of slurry. Further the frother also stabilizes the froth which lies on the top of the flotation cell.

The term “concentrate” has the meaning of flotation product and refers to the material obtained as cell product (valuable material) in reverse flotation processes as well as to froth product as the material obtained in the froth (valuable material) in direct flotation processes. The term tailings or flotation tailings is understood economically and means the undesired product, impurities which are removed in direct or reverse flotation processes.

As used herein, the term “collector” relates to substances with the ability to adsorb to an ore particle and to make the ore particle hydrophobic in order to enable that the ore particles can attach to air bubbles during flotation. The collectors can, in particular, be surface active, can have emulsification properties, can act as wetting agent, can be a solubility enhancer and/or a foam or froth regulator.

“Comminuted” means powdered, pulverized, ground, or otherwise rendered into fine solid particles.

“Fine” means a composition of matter containing a mixture of a more wanted material, the beneficiary and a less wanted material, the gangue.

“Slurry” means a mixture comprising a liquid medium within which fines (which can be liquid and/or finely divided solids) are dispersed or suspended. When the slurry is sparged, the tailings remain in the slurry and at least some of the concentrate adheres to the sparge bubbles and rises up out of the slurry into a froth layer above the slurry, the liquid medium may be entirely water, partially water, or may not contain any water at all.

"Surfactant" and "Co-surfactant" is a broad term which includes anionic, nonionic, cationic, and zwitterionic surfactants, a co-surfactant is an additional one or more surfactants present with a first distinct surfactant that acts in addition to the first surfactant, to reduce or further reduce the surface tension of a liquid. Further enabling descriptions of surfactants and co-surfactants are stated in Kirk-Othmer, Encyclopedia of Chemical Technology, Third Edition, volume 8, pages 900-912, and in McCutcheon's Emulsifiers and Detergents, both of which are incorporated herein by reference.

"Sparging" means the introduction of gas into a liquid for the purpose of creating a plurality of bubbles that migrate up the liquid.

As used herein, the term "grade" relates to the content of the desired mineral or valuable or targeted material in the obtained concentrate after the beneficiation, e.g. the enrichment via flotation.

As used herein, the term "recovery" refers to the percentage of valuable material recovered after the enrichment via flotation. The relationship of grade (concentration) vs. recovery (amount) is a measure for the selectivity of froth flotation. The selectivity increases with increasing values for grade and/or recovery. With the selectivity the effectiveness/performance of the froth flotation can be described.

In one aspect the presently claimed invention is directed to a method for the beneficiation of at least one material, the method comprising the steps of:

a) providing a slurry comprising the at least one material dispersed in a liquid,
b) contacting the slurry with a collector composition,
c) recovering a beneficiated material, wherein the collector composition comprises a mixture of collector A and collector B; wherein the collector A are by-products obtained by hydroformylation of octene isomers and the collector B is selected from the group consisting of diesel, kerosene and $C_8$-$C_{20}$ olefins.

In another aspect, the presently claimed invention is directed to a collector composition comprising a mixture of collector A and collector B; wherein the collector A are by-products obtained by hydroformylation of octene isomers and the collector B is selected from the group consisting of diesel, kerosene and $C_8$-$C_{20}$ olefins.

Furthermore, it is an advantage that the collector composition comprising components A and B can efficiently be used for direct and/or reverse flotation of ores in order to increase the flotation selectivity and/or recovery.

Collector A

Collector A are by-products obtained by hydroformylation of octene isomers

By-Products Obtained by Hydroformylation of Octene Isomers

Surprisingly, it was found that by-products obtained by hydroformylation of octene isomers are suitable to achieve a high selectivity in froth flotation for beneficiation of coal when used as a collector.

The process of the hydroformylation of octene isomers is as disclosed below.

In a first step, the butenes are dimerized to give a mixture of isomeric octenes. The octene mixture is then hydroformylated to give $C_9$ aldehydes and then hydrogenated to give the alcohol mixture. In this reaction sequence, specific, defined parameters have to be adhered to, at least during the butene dimerization, preferably during the butene dimerization and the hydroformylation.

It is preferable, therefore, that the isomeric octenes mixture is obtained by bringing a hydrocarbon mixture comprising butenes into contact with a catalyst. The isobutene content of the hydrocarbon mixture is preferably 5% by weight or less, in particular 3% by weight or less, particularly preferably 2% by weight or less, and most preferably 1.5% by weight or less, based in each case on the total butene content. A suitable hydrocarbon stream is that known as the $C_4$ cut, a mixture of butenes and butanes, available in large quantities from FCC plants or from steam crackers. A starting material used with particular preference is that known as raffinate II, which is an isobutene-depleted $C_4$ cut.

A preferred starting material comprises from 50 to 100% by weight, preferably from 80 to 95% by weight, of butenes and from 0 to 50% by weight, preferably from 5 to 20% by weight, of butanes. The following makeup of the butenes can be given as a general guide to quantities:

| | |
|---|---|
| 1-butene | from 1 to 98% by weight, |
| cis-2-butene | from 1 to 50% by weight, |
| trans-2-butene | from 1 to 98% by weight, and |
| isobutene | up to 5% by weight. |

The hydrocarbon mixture comprising butenes is brought into contact with the catalyst, preferably at temperatures of from 30 to 280° C., in particular from 30 to 140° C. and particularly preferably from 40 to 130° C. This preferably takes place at a pressure of from 10 to 300 bar, in particular from 15 to 100 bar and particularly preferably from 20 to 80 bar. The pressure here is usefully set in such a way that the olefin-rich hydrocarbon mixture is liquid or in the supercritical state at the temperature selected.

The octenes obtained are converted, in the second process step, by hydroformylation using synthesis gas in a manner known per se, into aldehydes having one additional carbon atom. The hydroformylation of olefins to prepare aldehydes is known per se and is described, for example, in J. Falbe, (ed.): New Synthesis with Carbon monoxide, Springer, Berlin, 1980. The hydroformylation takes place in the presence of catalysts homogeneously dissolved in the reaction medium. For the purposes of the presently claimed invention, the hydroformylation preferably takes place in the presence of a cobalt catalyst, in particular dicobaltoctacarbonyl $[Co_2(CO)_8]$.

Several by-products are formed during the hydroformylation process. These by-products include but are not limited to isomers of dinonyl ether, isomers of nonyl esters and isomers of trinonyl.

It has been surprising found that the by-products of the hydroformylation process could be used as collector in the beneficiation process alone or in combination of with diesel or kerosene or $C_8$-$C_{20}$ olefins.

In an embodiment, the by-products obtained by hydroformylation of octene isomers comprise at least one compound selected from the group consisting of isomers of dinonyl ether, isomers of nonyl esters and isomers of trinonyl esters and trinonyl ethers.

As used herein, isomers of trinonyl esters and trinonyl ethers refers to a mixture of esters and ethers that each contain at least three nonyl groups.

In an embodiment, the by-products obtained by hydroformylation of octene isomers comprise ≥3 wt. % to ≤30 wt. % isomers of dinonyl ether, ≥5 wt. % to ≤50 wt. % isomers of nonyl esters and ≥10 wt. % to ≤60 wt. % isomers of trinonyl esters and trinonyl ethers.

In a preferred embodiment, the by-products obtained by hydroformylation of octene isomers comprise ≥5 wt. % to ≤25 wt. % isomers of dinonyl ether, ≥10 wt. % to ≤40 wt. % isomers of nonyl esters and ≥15 wt. % to ≤50 wt. % isomers of trinonyl esters and trinonyl ethers.

In a most preferred embodiment, the by-products obtained by hydroformylation of octene isomers comprise ≥10 wt. % to ≤20 wt. % isomers of dinonyl ether, ≥20 wt. % to ≤35 wt. % isomers of nonyl esters and ≥25 wt. % to ≤45 wt. % isomers of trinonyl esters and trinonyl ethers.

In an embodiment, the by-products obtained by hydroformylation of octene isomers have a boiling point ≥294° C.

In an embodiment, the by-products are obtained by hydroformylation of octene isomers at a temperature in the range of ≥120° C. to ≤240° C. and separating the by-products from the mixture by distillation at a temperature in the range of ≥200° C. to ≤250° C. to isolate the by-products.

Collector B

In an embodiment, of the presently claimed invention, the collector B is used in combination with collector A. Collector B is selected from the group consisting of diesel, kerosene and $C_8$-$C_{20}$ olefins.

Diesel

Diesel is produced from the fractional distillation of crude oil between 200° C. to 350° C. at atmospheric pressure, resulting in a mixture of carbon chains that typically contain between 8 and 21 carbon atoms per molecule.

In an embodiment, the diesel comprises paraffins, naphthenes and aromatic compounds.

In an embodiment, the diesel comprises about 75% saturated hydrocarbons (paraffins including n, iso, and cycloparaffins), and 25% aromatic hydrocarbons (including naphthalenes and alkylbenzenes).

In an embodiment, the diesel fuel contains the $C_{10}$-$C_{15}$ carbon chain. In a preferred embodiment the diesel fuel contains $C_{12}$-$C_{14}$ carbon chain.

Kerosene

Kerosene is a low viscosity, clear liquid formed from hydrocarbons obtained from the fractional distillation of petroleum between 150 and 275° C., resulting in a mixture with a density of 0.78-0.81 g/$cm^3$ composed of carbon chains that typically contain between 10 and 16 carbon atoms per molecule.

In an embodiment, kerosene comprises branched and straight chain alkanes, naphthenes and aromatic hydrocarbon and olefins.

In an embodiment, kerosene contains 70% branched and straight chain alkanes and naphthenes (cycloalkanes), 25% aromatic hydrocarbons such as alkylbenzenes (single ring) and alkylnaphthalenes. Olefins are usually not present at more than 5% by volume.

$C_8$-$C_{20}$ Olefins

Olefins are alkenes with a chemical formula $C_xH_{2x}$. Linear alpha olefins are a range of industrially important alpha-olefins, including 1-butene, 1-hexene, 1-octene, 1-decene, 1-dodecene, 1-tetradecene, 1-hexadecene, 1-octadecene and higher olefin blends of $C_{20}$-$C_{24}$, $C_{24}$-$C_{30}$ and $C_{20}$-$C_{30}$ ranges. Industrially, linear alpha olefins are commonly manufactured by two main routes: oligomerization of ethylene and by Fischer-Tropsch synthesis followed by purification. Another route to linear alpha olefins which has been used commercially on small scale is dehydration of alcohols.

In an embodiment, the component B is selected from $C_8$-$C_{20}$ olefins or mixtures thereof. In a preferred embodiment, the component B is selected from $C_8$-$C_{15}$ olefins or mixtures thereof. In another preferred embodiment, the component B is selected from $C_{10}$-$C_{14}$ olefins or mixtures thereof. In a most preferred embodiment, the component B is selected from $C_{10}$-$C_{12}$ olefins or mixtures thereof.

Collector Composition

In an embodiment, the collector composition comprises ≥10 wt. % to ≤90 wt. % of collector A and ≥90 wt. % to ≤10 wt. % of collector B.

In an embodiment, the collector composition comprises ≥25 wt. % to ≤75 wt. % of collector A and ≥75 wt. % to ≤25 wt. % of collector B.

In a preferred embodiment, the collector composition comprises ≥40 wt. % to ≤60 wt. % of collector A and ≥60 wt. % to ≤40 wt. % of collector B.

Preferably, the amount of component A in weight-% in relation to the total collector composition is 40 wt. %, 42 wt. %, 44 wt. %, 46 wt. %, 48 wt. %, 50 wt. %, 52 wt. %, 54 wt. %, 56 wt. %, 58 wt. %, 60 wt. % or any value between these values or ranges thereof.

Preferably, the amount of component B in weight-% in relation to the total collector composition is 60 wt. %, 58 wt. %, 56 wt. %, 54 wt. %, 52 wt. %, 50 wt. %, 48 wt. %, 46 wt. %, 44 wt. %, 42 wt. %, 40 wt. % or any value between these values or ranges thereof.

In an embodiment, the collector composition is present in an amount of ≥10 g/ton to ≤10000 g/ton of the material.

In a preferred embodiment, the collector composition is present in an amount of ≥25 g/ton to ≤5000 g/ton of the material.

In a most preferred embodiment, the collector composition is present in an amount of ≥50 g/ton to ≤2000 g/ton of the material.

Frothing Agent

In an embodiment of the presently claimed invention, a frothing agent is added to the slurry.

In a preferred embodiment, the frothing agents are added to the slurry which are selected from the group consisting of pine oil, aliphatic alcohols such as MIBC (methyl isobutyl carbinol), polyglycols, polyglycol ethers, polypropylene glycol ethers, polyoxyparafins, cresylic acid (Xylenol), distillate bottoms of 2-ethyl hexanol, 2-ethyl-1-hexanol, n-butanol, 2-methyl-2-butanol, isononyl alcohol, isodecyl alcohol, by products of hydroformylation of propene and mixtures thereof.

Other frothing agents are set forth, for example, in U.S. Pat. Nos. 4,278,533, 4,528,107, 5,022,983, 2,094,646, and U.S. Patent Publication 2003/0146134, all of which are incorporated herein by reference for all purposes. The amount of frother employed in the process of the presently claimed invention will vary depending upon the amount/type of solid feed material, e.g., coal, being treated. In general, the frothing agent, depending on its nature will be present in amounts ranging from at least about 3 ppm of feed material, e.g., raw coal, up to about 100 ppm of feed material where feed material includes both the frothable (hydrophobic) solids and non-frothable solids (gangue).

In a more preferred embodiment, the frothing agent is MIBC (methyl isobutyl carbinol), oxygenated hydrocarbons. In a preferred embodiment, the frothing agent is distillate bottoms of 2-ethyl-hexanol, n-butanol, 2-methyl-2-butanol, isononyl alcohol or isodecyl alcohol.

In a most preferred embodiment, the frothing agent is a distillate bottoms of 2-ethyl hexanol.

In another most preferred embodiment, the frothing agent comprises 2-ethyl-hexanol, by-products from the distillation of 2-ethyl-hexanol and 2,4-diethyloctane-1,5-diol.

Auxiliary Agents

In an embodiment, an auxiliary agent is added to the slurry for the beneficiation process which is selected from the group consisting of surfactants, depressants and activators Preferably, the amount of the auxiliary agent is in the range from 0% to 10%, more preferably in the range from 0.2% to 8%, even more preferably in the range from 0.4% to 6% and most preferably in the range from 0.5% to 5%.

In an embodiment, the surfactants are selected from the group consisting of non-ionic surfactants, cationic surfactants and anionic surfactants.

The non-ionic surfactants are selected from the group consisting of fatty alcohol polyglycol ethers, alkylphenol polyglycol ethers, fatty acid polyglycol esters, fatty acid amide polyglycol ethers, fatty amine polyglycol ethers, alkoxylated triglycerides, alkyl oligoglucosides, fatty acid-N-alkyl glucamides, polyol fatty acid esters, sugar esters, sorbitan esters and polysorbates, polyoxyethylene alkyl ethers, polyoxyethylene alkyl phenyl ethers, polyethylene glycerol fatty acid esters; polyethylene glycol fatty acid esters, and mixtures thereof.

The anionic surfactants are selected from the group consisting of alkyl benzene sulfonates, alkane sulfonates, olefin sulfonates, alkyl ether sulfonates, glycerol ether sulfonates, alpha-methyl ester sulfonates, sulfofatty acids, alkyl sulfates, monoglyceride (ether) sulfates, fatty acid amide (ether) sulfates, mono- and dialkyl sulfosuccinates, mono- and dialkyl sulfosuccinamates, sulfotriglycerides, amide soaps, ether carboxylic acids and salts thereof, fatty acid isethionates, fatty acid sarcosinates, fatty acid taurides, acyl lactylates, acyl tartrates, acyl glutamates, acyl aspartates, alkyl oligoglucoside sulphates and alkyl (ether) phosphates, and mixtures thereof.

The cationic surfactants are selected from the group consisting of alkylamines and their salts. alkyl imidazolines, ethoxylated amines and quaternaries, such as alkylbenzyldimethylammonium salts, alkyl benzene salts, heterocyclic ammonium salts, tetra alkylammonium salts and mixtures thereof.

In an embodiment, the depressants are selected from the group consisting of sodium isopropylnaphthalene sulfonate, sodium dioctylsulfo succinate, poly(ethylene) oxide, polycarboxylate ethers, sodium polyacrylate, polysaccharides, cellulose derivatives, and tannic acid.

In an embodiment, the activators are selected from the group consisting of copper sulfate, barium nitrate, calcium chloride and sodium sulphide.

Material

The material as defined in the presently claimed invention is the material which is desired in the pure form and which is free of any impurities. In a beneficiation process, two or more materials which coexist in a mixture (the fines) are separated from each other using chemical and/or mechanical processes. Often one of the materials (the beneficiary) is more valuable or desired than the other material (the gangue). One form of beneficiation is froth floatation.

In froth flotation separation the material is mixed with water to form a slurry. The slurry is then sparged to form bubbles which rise up out of the slurry. The more hydrophobic material (the concentrate) adheres to and rises up with the bubbles and gathers in a froth layer above the slurry. The less hydrophobic material (the tailings) remains behind in the slurry.

Froth flotation separation can be used to separate solids from solids (such as the constituents of mine ore) or liquids from solids or from other liquids (such as the separation of bitumen from oil sands). When used on solids, froth separation also includes having the solids comminuted (ground up by such techniques as dry-grinding, wet-grinding, and the like). After the solids have been comminuted they are more readily dispersed in the slurry and the small solid hydrophobic particles can more readily adhere to the sparge bubbles.

The collector composition of the presently claimed invention could be used in the beneficiation of different minerals, including copper, lead, zinc, nickel, silver, manganese, chromium, cobalt, tungsten and titanium, and substances like coal, phosphorous, molybdenum using froth flotation. Additionally, froth flotation has been applied in non-mineral industries including water purification, paper de-inking, and chemical, plastics, and food processing.

In an embodiment, the collector composition is used for the beneficiation of coal, phosphate ore or molybdenum ore In an embodiment, the collector composition is used for the beneficiation of coal.

In an embodiment, the collector composition of the presently claimed invention is used in form of a "ready to use" composition, which means that a mixture of the component A, component B can be prepared and optionally stored, before the collector composition is used in a flotation process. Such mixture can be named "pre-mixture" and can act for example as self-emulsifying composition when the collector composition (pre-mixture) is added to an ore-slurry before start of the flotation. Further preferred is also that the individual components A and B are added separately to an ore-slurry before flotation starts.

It is an advantage that by using the collector composition according to the presently claimed invention differences in hydrophobicity between desired material and the undesired material is increased.

Flotation Process

The flotation process could be carried out as direct flotation or reverse flotation.

A direct flotation process for the beneficiation of materials comprises the steps of:

A) mixing the material in water to obtain an aqueous mixture,
B) adjusting the pH of the aqueous mixture obtained in step a) to a desired level to obtain a pH adjusted aqueous mixture,
C) optionally, adding a depressant to the aqueous mixture,
D) adding the collector composition to the pH adjusted aqueous mixture,
E) agitating the pH adjusted aqueous mixture obtained in step d) under air injection to generate froth, and
F) collecting of the material in the froth.

A reverse flotation process for the beneficiation of the material by collection of impurities formed in the froth, comprises the steps of:

I) mixing the material in water to obtain an aqueous mixture,
II) adjusting the pH of the aqueous mixture obtained in step a) to a desired level to obtain a pH adjusted aqueous mixture,
III) optionally, adding a depressant to the aqueous mixture, IV) adding the collector composition to the pH adjusted aqueous mixture, V) agitating the pH adjusted aqueous mixture obtained in step d) under air injection to generate froth, and VI) collecting impurities in the froth, and VII) recovering the material.

Flotation can be undertaken in several stages/cycles to maximize the recovery of the desired mineral and to maximize the concentration of the desired mineral. Surprisingly, by addition of the collector composition of the presently claimed invention the number of stages/cycles can be reduced while achieving the same grade as with more stages/cycles.

As noted, froth flotation can be performed in mechanically agitated cells or tanks, or in tall flotation columns. Generally speaking, froth flotation equipment can be divided into general groups of mechanical cells, and flotation columns. Mechanical cells use a large mixture and diffuser mechanism at the bottom of the mixing tank to introduce air and provide mixing action. Froth flotation columns on the other hand use air spargers to introduce air at the bottom of a tall column while introducing the slurry containing the feed material above. The countercurrent motion of the slurry flowing down and the air flowing up provides mixing action. Mechanical cells generally have a higher throughput rate, but produce material that is of lower quality, while froth flotation columns generally have a low throughput rate but produce higher quality material. The other type of flotation cells which could be used for the present invention include but are not limited to Jameson flotation cell, WEMCO® flotation cell, Dorr-Oliver flotation cell.

In the process of the presently claimed invention and is as well known to those skilled in the art, froth flotation of coal and other solids is generally carried out in cells. In the process of the presently claimed invention the collector and the frother may be combined before use and supplied to the froth flotation cell as a mixture or they may be fed separately to the cell if desired.

When conducting a froth flotation process according to the presently claimed invention, and as is well known to those skilled in the art, a slurry of a particulate feed material containing the desired product to be recovered, e.g., coal, together with the gangue is introduced into a suitable froth flotation vessel which can be a mechanically agitated cell, tank, or a flotation column. It is necessary to grind the feed material to increase the surface area and to break the feed material into the desired product to be recovered and the gangue. The particle size of the feed material will, of course, depend upon the nature of the feed material, and the product to be recovered. The collectors of the present invention are introduced first in the flotation cell along with the mixture of the particulate feed material and allowed to mix with the feed material. The frother and the other auxiliary agents are then added to the flotation cell. The collectors of the presently claimed invention enhance the hydrophobicity of the product to be recovered such that under sufficient aeration to create bubbles, such particles are released from the aqueous slurry by attaching to the air bubbles which rise to the surface forming a foam. The foam is then removed, and the product is separated from the foam. Alternatively, the collector could be added along with the frother or emulsified along with the frother and introduced in the flotation cell.

In another aspect the presently claimed invention is directed to a composition comprising at least one material, a collector composition and a liquid, wherein the collector composition comprises a mixture of collector A and collector B as defined above.

In a preferred embodiment, the composition comprises at least one material, at least one frothing agent, a collector composition and a liquid, wherein the collector composition comprises a mixture of collector A and collector B as defined above.

In another preferred embodiment, the composition comprises coal, at least one frothing agent, a collector composition and water, wherein the collector composition comprises a mixture of collector A and collector B as defined above.

In another preferred embodiment, the composition comprises coal, at least one frothing agent selected from the group consisting of pine oil, aliphatic alcohols, polyglycols, polyglycol ethers, polypropylene glycol ethers, polyoxyparafins, cresylic acid (xylenol), distillate bottoms of 2-ethyl-1-hexanol, n-butanol, 2-methyl-2-butanol, isononyl alcohol and isodecyl alcohol, water, at least one compound selected from the group consisting of isomers of dinonyl ether, isomers of nonyl esters and isomers of trinonyl esters and trinonyl ethers; and at least one compound selected from the group consisting of diesel, kerosene and $C_8$-$C_{20}$ olefins.

In another preferred embodiment, the composition comprises coal, distillate bottoms of 2-ethyl-1-hexanol, preferably 2-ethyl-1-hexanol, water, at least one compound selected from the group consisting of isomers of dinonyl ether, isomers of nonyl esters and isomers of trinonyl esters and trinonyl ethers; and at least one compound selected from the group consisting of diesel, kerosene and $C_8$-$C_{20}$ olefins.

Although the invention has been described with respect to specific embodiments and examples, it should be appreciated that other embodiments utilizing the concept of the presently claimed invention are possible without departing from the scope of the invention. The presently claimed invention is defined by the claimed elements, and any and all modifications, variations, or equivalents that fall within the true spirit and scope of the underlying principles.

Advantages:

The process of the presently claimed invention shows at least one of the following advantages:

1. A material, such as coal, is separated from a second material, such as water, in a high yield with high selectivity.
2. The collector composition is used in low concentrations.
3. The method enables short processing times.
4. The particle size of the particles that are effectively floated is increased.

Embodiments

1. A method for the beneficiation of at least one material, the method comprising the steps of:

a) providing a slurry comprising the at least one material dispersed in a liquid, b) contacting the slurry with a collector composition, c) recovering a beneficiated material, wherein the collector composition comprises a mixture of collector A and collector B;

wherein the collector A are by-products obtained by hydroformylation of octene isomers and the collector B is selected from the group consisting of diesel, kerosene and $C_8$-$C_{20}$ olefins.

2. The method according to embodiment 1, wherein the by-products obtained by hydroformylation of octene isomers comprise at least one compound selected from the group consisting of isomers of dinonyl ether, isomers of nonyl esters and isomers of trinonyl esters and trinonyl ethers.

3. The method according to embodiment 1 or embodiment 2, wherein the by-products obtained by hydroformylation of octene isomers comprise ≥10 wt. % to ≤20 wt. % isomers of dinonyl ether, ≥20 wt. % to ≤35 wt. % isomers of nonyl esters and ≥25 wt. % to ≤45 wt. % isomers of trinonyl esters and trinonyl ethers.

4. The method according to one or more of embodiments 1 to 3, wherein the by-products have a boiling point ≥294° C.

5. The method according to one or more of embodiments 1 to 4, wherein the by-products are obtained by hydroformylation of octene isomers at a temperature in the range of ≥120° C. to ≤240° C. and separating the by-products from the mixture by distillation at a temperature in the range of ≥200° C. to ≤250° C. to isolate the by-products.

6. The method according to one or more of embodiments 1 to 5, wherein the diesel comprises paraffins, naphthenes and aromatic compounds.

7. The method according to one or more of embodiments 1 to 6, wherein the kerosene comprises branched and straight chain alkanes, naphthenes and aromatic hydrocarbon.

8. The method according to one or more of embodiments 1 to 7, wherein the collector composition comprises ≥10 wt. % to ≤90 wt. % of collector A and ≥90 wt. % to ≤10 wt. % of collector B.

9. The method according to one or more of embodiments 1 to 7, wherein the collector composition comprises ≥25 wt. % to ≤75 wt. % of collector A and ≥75 wt. % to ≤25 wt. % of collector B.

10. The method according to one or more of embodiments 1 to 7, wherein the collector composition comprises ≥40 wt. % to ≤60 wt. % of collector A and ≥60 wt. % to ≤40 wt. % of collector B.

11. The method according to any one according to one or more of embodiments 1 to 10, wherein the collector composition is present in an amount of 50 g/ton to 2000 g/ton of the material.

12. The method according to one or more of embodiments 1 to 11, wherein at least one frothing agent is added to the slurry.

13. The method according to one or more of embodiments 1 to 12, wherein at least one auxiliary agent is added to the slurry.

14. The method according to embodiment 12, wherein the at least one frothing agent is selected from the group consisting of pine oil, aliphatic alcohols, polyglycols, polyglycol ethers, polypropylene glycol ethers, polyoxyparafins, cresylic acid (xylenol), distillate bottoms of 2-ethyl hexanol, 2-ethyl-1-hexanol, n-butanol, 2-methyl-2-butanol, isononyl alcohol, isodecyl alcohol and mixtures thereof.

15. The method according to embodiment 13, wherein the at least one auxiliary agent is selected from the group consisting of surfactants, depressants and activators.

16. The method according to embodiment 15, wherein the surfactants are selected from the group consisting of non-ionic surfactants, cationic surfactants and anionic surfactants.

17. The method according to embodiment 16, wherein the non-ionic surfactants are selected from the group consisting of fatty alcohol polyglycol ethers, alkylphenol polyglycol ethers, fatty acid polyglycol esters, fatty acid amide polyglycol ethers, fatty amine polyglycol ethers, alkoxylated triglycerides, alkyl oligoglucosides, fatty acid-N-alkyl glucamides, polyol fatty acid esters, sugar esters, sorbitan esters and polysorbates, polyoxyethylene alkyl ethers, polyoxyethylene alkyl phenyl ethers, polyethylene glycerol fatty acid esters; polyethylene glycol fatty acid esters, and mixtures thereof.

18. The method according to embodiment 16, wherein the anionic surfactants are selected from the group consisting of alkyl benzene sulfonates, alkane sulfonates, olefin sulfonates, alkyl ether sulfonates, glycerol ether sulfonates, alpha-methyl ester sulfonates, sulfofatty acids, alkyl sulfates, monoglyceride (ether) sulfates, fatty acid amide (ether) sulfates, mono- and dialkyl sulfosuccinates, mono- and dialkyl sulfosuccinamates, sulfotriglycerides, amide soaps, ether carboxylic acids and salts thereof, fatty acid isethionates, fatty acid sarcosinates, fatty acid taurides, acyl lactylates, acyl tartrates, acyl glutamates, acyl aspartates, alkyl oligoglucoside sulphates and alkyl (ether) phosphates, and mixtures thereof.

19. The method according to embodiment 16, wherein the cationic surfactants are selected from the group consisting of alkylamines and their salts. alkyl imidazolines, ethoxylated amines and quaternaries, alkyl benzene salts, heterocyclic ammonium salts, tetra alkylammonium salts and mixtures thereof.

20. The method according to embodiment 15, wherein the depressants are selected from the group consisting of sodium isopropylnaphthalene sulfonate, sodium dioctylsulfo succinate, poly(ethylene) oxide, polycarboxylate ethers, sodium polyacrylate, polysaccharides, cellulose derivatives, and tannic acid.

21. The method according to embodiment 15, wherein the activators are selected from the group consisting of copper sulfate, barium nitrate, calcium chloride and sodium sulphide.

22. The method according to one or more of embodiments 1 to 21, wherein the at least one material is selected from the group consisting of coal, phosphate ore, molybdenum ore and graphite ore.

23. The method according to one or more of embodiments 1 to 22, wherein the liquid is water.

24. A composition comprising at least one material, a collector composition and a liquid, wherein the collector composition comprises a mixture of collector A and collector B; as defined in one or more of embodiments 1 to 23.

25. Use of a collector composition comprising a mixture of collector A and collector B; as defined in one or more of embodiments 1 to 24 for beneficiation of at least one material.

EXAMPLES

The invention is further described by the following examples. The examples relate to practical and in some cases preferred embodiments of the invention that do not limit the scope of the invention.

Materials

Diesel

Kerosene is available from Exxon Mobil as Exxsol® D80 which is an aliphatic hydrocarbons mixture Collector C is a mixture of by-products obtained by hydroformylation of octene isomer (available from BASF) and Exxsol® D80.

The by-products of hydroformylation of octene isomer contain

≥10 wt. % to ≤20 wt. % isomers of dinonyl ether,

≥20 wt. % to ≤35 wt. % isomers of nonyl esters and

≥25 wt. % to ≤45 wt. % isomers of trinonyl esters and trinonyl ethers.

Lupromin® FF 1908 is a frother which contains oxygenated hydrocarbons (mixture of 2-ethyl-1-hexanol, by-products of the distillation of 2-ethyl-1-hexanol and 2,4-diethyloctane-1,5-diol) available from BASF.

Example 1

A sample of a coal slurry was floated in the laboratory using a Denver flotation machine. The tests were designed to determine the utility of the collector mixture comprising collector A and collector B.

Samples

Sample 1 and sample 2 are samples of thermal coal from Australia

Plant Operating Data

Flotation flowrate per module 2225 $m^3/h$

The solids concentration in the flotation feed varies from 6%, m/m to 12%, m/m and is nominally 8%, m/m The cell type used is mechanically agitated flotation cells Wash water is not used The collector dose rate is 100 L/h per module Flotation Testing Conditions Cell used=4 L Denver Cell Air rate=4 L/min Sample mixing time=1 min Collector conditioning time=2 min Sample collection time=3 min Frother dose for sample 1=$^7$ ppm Frother dose for samples 2, 3 and 4=10 ppm Collector dose all samples=0.6 g/kg Frother Used:

Lupromin® FF 1908

Collectors Used

Diesel

Collector C— Composition comprising collector A and B. The composition is a 1:1 mixture of the by-products obtained by hydroformylation of octene isomer and Exxsol® D80. Exxsol® D80 is characterized as "de-aromatized" aliphatic hydrocarbon solvent. The major components are normal paraffins, isoparaffins and cycloparaffins.

The floatation test results are enunciated in the below tables 1 to 4

TABLE 1

Flotation test results for Sample 1 with 7 ppm of frother and 0.6 g/kg of collector.

| | Lupromin ® FF 1908 & Diesel | | | | | Lupromin ® FF 1908 & Collector C | | | | |
|---|---|---|---|---|---|---|---|---|---|---|
| Concentrate (t, s) | Mass (g) | Ash (%) | Mass (%) | Cum Mass (%) | Cum Ash (%) | Mass (g) | Ash (%) | Mass (%) | Cum Mass (%) | Cum Ash (%) |
| 1 (15 s) | 12.6 | 12.9 | 8.4 | 8.4 | 12.9 | 38.4 | 8.1 | 25.8 | 25.8 | 8.1 |
| 2 (30 s) | 5.72 | 12.5 | 3.8 | 12.2 | 12.8 | 9.73 | 13.3 | 6.5 | 32.4 | 9.2 |
| 3 (45 s) | 4.6 | 12.5 | 3.1 | 15.3 | 12.7 | 4.89 | 15.3 | 3.3 | 35.7 | 9.7 |
| 4 (60 s) | 3.83 | 14.2 | 2.6 | 17.9 | 12.9 | 3.78 | 26.5 | 2.5 | 38.2 | 10.8 |
| 5 (120 s) | 11.02 | 14.5 | 7.4 | 25.2 | 13.4 | 6.9 | 19.5 | 4.6 | 42.8 | 11.8 |
| 6 (180 s) | 7.49 | 18.9 | 5.0 | 30.2 | 14.3 | 3.88 | 28.4 | 2.6 | 45.4 | 12.7 |
| Tails | 104.5 | 58.7 | 69.8 | | | 81.2 | 72.7 | 54.6 | | |

TABLE 2

Flotation test results for sample 2 with 10 ppm of frother and 0.6 g/kg of collector.

| | Lupromin ® FF 1908 & Diesel | | | | | Lupromin ® FF 1908 & Collector C | | | | |
|---|---|---|---|---|---|---|---|---|---|---|
| Concentrate (t, s) | Mass (g) | Ash (%) | Mass (%) | Cum Mass (%) | Cum Ash (%) | Mass (g) | Ash (%) | Mass (%) | Cum Mass (%) | Cum Ash (%) |
| 1 (15 s) | 7.82 | 26.1 | 2.4 | 2.4 | 26.1 | 51.9 | 16.9 | 16.0 | 16.0 | 16.9 |
| 2 (30 s) | 5.82 | 30.5 | 1.8 | 4.3 | 28.0 | 17.6 | 20.3 | 5.4 | 21.4 | 17.8 |
| 3 (45 s) | 3.38 | 26.5 | 1.1 | 5.3 | 27.7 | 9.34 | 20.1 | 2.9 | 24.3 | 18.0 |
| 4 (60 s) | 4.14 | 30.6 | 1.3 | 6.6 | 28.3 | 7.1 | 25.8 | 2.2 | 26.5 | 18.7 |
| 5 (120 s) | 14.8 | 29.7 | 4.6 | 11.2 | 28.9 | 16.1 | 28 | 5.0 | 31.5 | 20.1 |
| 6 (180 s) | 11.61 | 33.8 | 3.6 | 14.9 | 30.1 | 11.11 | 40.2 | 3.4 | 34.9 | 22.1 |
| Tails | 272.2 | 61.5 | 85.1 | | | 211.3 | 75.6 | 65.1 | | |

An improvement in performance was then seen when Lupromin® FF 1908 frother was used in conjunction with the collector C. Using the collector C in conjunction with the Lupromin® FF 1908 frother resulted in a yield increase to 45.4% with a reduction in ash of 1.6%. (see table 3 below)

TABLE 3

Final mass yield and ashes achieved sample 1.

| Reagent combination | Total Mass Yield | Total Ash |
|---|---|---|
| Lupromin ® FF 1908 + Diesel | 30.2% | 14.3% |
| Lupromin ® FF 1908 + Collector C | 45.4% | 12.7% |

In addition to a large increase in yield, the collector C displayed improved selectivity over diesel. There was also a major increase in the kinetics with the amount of recovered material in the first 15 seconds of the test for the Lupromin® FF 1908 and collector C. The amount of coal recovered in the first 15 s using Lupromin® FF 1908 and collector C was also higher.

TABLE 4

Final mass yield and ashes achieved with sample 2.

| Reagent combination | Total Mass Yield | Total Ash |
|---|---|---|
| Lupromin ® FF 1908 + Diesel | 14.9% | 30.1% |
| Lupromin ® FF 1908 + Collector C | 34.9% | 22.1% |

The results again showed that the combination of using Lupromin® FF 1908 and collector C could increase the yield from 14.9% produced using Lupromin® FF 1908 and diesel to 34.9%,

Example 2

Sample: Oxidized Coal

Conditions used for the testing were:

Frother—10 ppm

Collector—0.13 g/kg

Wash water—4 L/min

Air dose rate 50 L/min

Testing was carried out in a 190 mm diameter laboratory column flotation cell (Microcell). The collection time for each concentrate was 5 minutes.

Frother Used:

Lupromin® FF 1908

Collectors Used:

Diesel

Composition comprising collector A and B (collector C). The composition is a 1:1 mixture of the by-products obtained by hydroformylation of octene isomer and Exxsol D80. Exxsol® D80 is characterized as “de-aromatized” aliphatic hydrocarbon solvent. The major components are normal paraffins, isoparaffins and cycloparaffins.

TABLE 5

Flotation testing with Lupromin ® FF 1908 and Diesel in a lab column cell.

| | | | | Cumulative | | | |
|---|---|---|---|---|---|---|---|
| Concen-trate | Mass g d | Mass % d | Ash % d | Mass %, m/m d/d | Ash % d | froth depth mm | Cumu-lative time min |
| 1 | 331.59 | 22.9 | 3.8 | 22.9 | 3.8 | 500 | 5 |
| 2 | 419.39 | 29.0 | 4.9 | 51.8 | 4.4 | 300 | 10 |
| 3 | 109.84 | 7.6 | 5.3 | 59.4 | 4.5 | 100 | 15 |
| Tails | 587.82 | 40.6 | 39.8 | 100.0 | 18.9 | | |

TABLE 6

Flotation testing with Lupromin ® FF 1908 and collector C in a lab column cell.

| | | | | Cumulative | | | |
|---|---|---|---|---|---|---|---|
| Concen-trate | Mass g d | Mass % d | Ash % d | Mass %, m/m d/d | Ash % d | froth depth mm | Cumu-lative time min |
| 1 | 770.94 | 50.3 | 3.3 | 50.3 | 3.3 | 800 | 5 |
| 2 | 318.68 | 20.8 | 5.9 | 71.0 | 4.1 | 500 | 10 |
| 3 | 94.23 | 6.1 | 9.0 | 77.2 | 4.5 | 300 | 15 |
| 4 | 56.06 | 3.7 | 10.5 | 80.8 | 4.7 | 100 | 20 |
| Tails | 294.06 | 19.2 | 75.8 | 100.0 | 18.3 | | |

The results from the testing clearly show there was a significant increase in yield using collector C compared to using diesel. Using Lupromin® FF 1908 and collector diesel had a mass yield of 59.4%, m/m (d/d) at a total product ash of 4.5%, (d) whereas using Lupromin® FF 1908 with collector C achieved a mass yield of 80.8% m/m at an ash of 4.7% (d). A yield increase of 21.4% m/m (d/d) with no significant increase in product ash was observed. The kinetics also increased markedly over the first collection period with more than double the amount of material recovered when using collector C, 50.3% m/m (d/d) compared to diesel 22.9% m/m (d/d).

The use of the collector C greatly improved the recovery of the oxidized coal while not increasing the product ash above the target ash range of 6%, d.

The invention claimed is:

1. A method for the beneficiation of at least one material, the method comprising:

a) providing a slurry comprising the at least one material dispersed in a liquid, b) contacting the slurry with a collector composition, c) subjecting the at least one material to beneficiation to result in a beneficiated material, and c) recovering the beneficiated material, wherein the collector composition comprises a mixture of collector A and collector B;

wherein the collector A are by-products obtained by hydroformylation of octene isomers and the collector B is selected from the group consisting of diesel, kerosene and $C_8$-$C_{20}$ olefins;

wherein the by-products obtained by hydroformylation of octene isomers comprise

≥10 wt. % to ≤20 wt. % isomers of dinonyl ether,

≥20 wt. % to ≤35 wt. % isomers of nonyl esters and

≥25 wt. % to ≤45 wt. % isomers of trinonyl esters and trinonyl ethers.

2. The method according to claim 1, wherein the by-products have a boiling point of ≥294° C.

3. The method according to claim 1, wherein the by-products are obtained by hydroformylation of octene isomers at a temperature in the range of ≥120° C. to ≤ 240° C. and separating the by-products from the mixture by distillation at a temperature in the range of ≥200° C. to ≤250° C. to isolate the by-products.

4. The method according to claim 1, wherein the diesel comprises paraffins, naphthenes and aromatic compounds.

5. The method according to claim 1, wherein the kerosene comprises branched and straight chain alkanes, naphthenes and aromatic hydrocarbon.

6. The method according to claim 1, wherein the collector composition comprises ≥10 wt. % to ≤90 wt. % of collector A and ≥90 wt. % to ≤10 wt. % of collector B.

7. The method according to claim 1, wherein the collector composition is present in an amount of ≥50 g/ton to ≤2000 g/ton of the at least one material.

8. The method according to claim 1, wherein at least one frothing agent is added to the slurry.

9. The method according to claim 1, wherein at least one auxiliary agent selected from the group consisting of surfactants, depressants and activators is added to the slurry.

10. The method according to claim 9, wherein the surfactants are selected from the group consisting of non-ionic surfactants, cationic surfactants and anionic surfactants.

11. The method according to claim 9, wherein the depressants are selected from the group consisting of sodium isopropylnaphthalene sulfonate, sodium dioctylsulfo succinate, poly(ethylene) oxide, polycarboxylate ethers, sodium polyacrylate, polysaccharides, cellulose derivatives, and tannic acid.

12. The method according to claim 9, wherein the activators are selected from the group consisting of copper sulfate, barium nitrate, calcium chloride and sodium sulphide.

13. The method according to claim 1, wherein the at least one material is selected from the group consisting of coal, phosphate ore, molybdenum ore and graphite ore.

14. The method according to claim 1, wherein the liquid is water.

15. A composition comprising at least one target material, a collector composition and a liquid, wherein the collector composition comprises a mixture of collector A and collector B;

wherein the collector A are by-products obtained by hydroformulation of octene isomers and the collector B is selected from the group consisting of diesel, kerosene and $C_8$-$C_{20}$ olefins;

wherein the by-products obtained by hydroformylation of octene isomers comprise

≥10 wt. % to ≤20 wt. % isomers of dinonyl ether,

≥20 wt. % to ≤35 wt. % isomers of nonyl esters and

≥25 wt. % to ≤45 wt. % isomers of trinonyl esters and trinonyl ethers.

* * * * *